US 6,574,724 B1

(12) United States Patent
Hoyle et al.

(10) Patent No.: US 6,574,724 B1
(45) Date of Patent: Jun. 3, 2003

(54) MICROPROCESSOR WITH NON-ALIGNED SCALED AND UNSCALED ADDRESSING

(75) Inventors: David Hoyle, Glendale, AZ (US); Joseph R. Zbiciak, North Richland Hills, TX (US); Jeremiah E. Golston, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 339 days.

(21) Appl. No.: 09/702,474

(22) Filed: Oct. 31, 2000

Related U.S. Application Data

(60) Provisional application No. 60/183,527, filed on Feb. 18, 2000, and provisional application No. 60/183,417, filed on Feb. 18, 2000.

(51) Int. Cl.$^7$ ............................................. G06F 12/00
(52) U.S. Cl. .................... 711/220; 711/200; 711/211; 711/217
(58) Field of Search ............................... 711/220, 217, 711/211, 200; 712/204, 210, 211, 235

(56) References Cited

U.S. PATENT DOCUMENTS

| | | | | |
|---|---|---|---|---|
| 5,072,418 A | * | 12/1991 | Boutaud et al. | 708/207 |
| 5,329,471 A | * | 7/1994 | Swoboda et al. | 703/23 |
| 5,535,331 A | * | 7/1996 | Swoboda et al. | 714/45 |
| 5,696,959 A | * | 12/1997 | Guttag et al. | 712/245 |
| 5,712,999 A | * | 1/1998 | Guttag et al. | 711/211 |
| 5,761,726 A | * | 6/1998 | Guttag et al. | 711/147 |
| 6,058,473 A | * | 5/2000 | Guttag et al. | 712/225 |
| 6,182,203 B1 | * | 1/2001 | Simar et al. | 712/22 |

OTHER PUBLICATIONS

Cook, "An Empirical Analysis of The Lilith Instruction Set," pp 156–158, IEEE, 1989.*

* cited by examiner

Primary Examiner—Matthew Kim
Assistant Examiner—Stephen Elmore
(74) Attorney, Agent, or Firm—Gerald E. Laws; W. James Brady, III; Frederick J. Telecky, Jr.

(57) ABSTRACT

A data processing system having a central processing (CPU) unit and a method of operation is provided. The CPU has an instruction set architecture that is optimized for intensive numeric algorithm processing. The CPU has dual load/store units connected to dual memory target ports of a memory controller. The CPU can execute two aligned data transfers each having a length of one byte, two bytes, four bytes, or eight bytes in parallel by executing two load/store instructions. The CPU can also execute a single non-aligned data transfer having a length of four bytes or eight bytes by executing a non-aligned load/store instruction that utilizes both memory target ports. A data transfer address for each load/store instruction is formed by fetching the instruction, decoding the instruction to determine instruction type, transfer data size, and scaling selection, selectively scaling an offset provided by the instruction and combining the selectively scaled offset with a base address value. The resultant address is then provided to the memory system to initiate a data transfer.

12 Claims, 9 Drawing Sheets

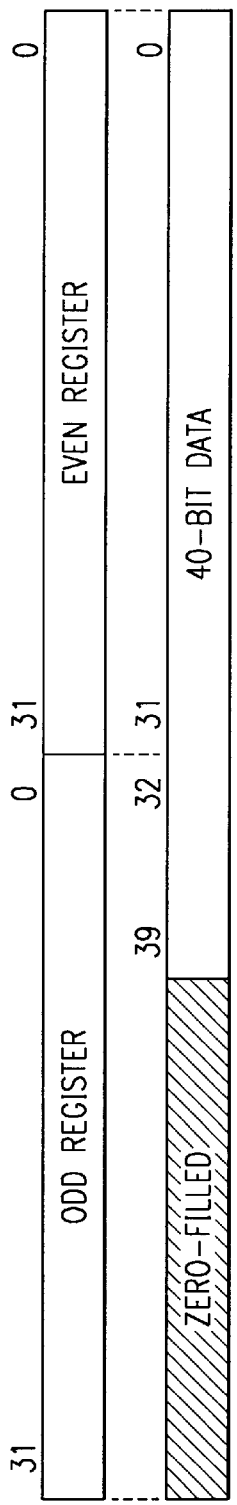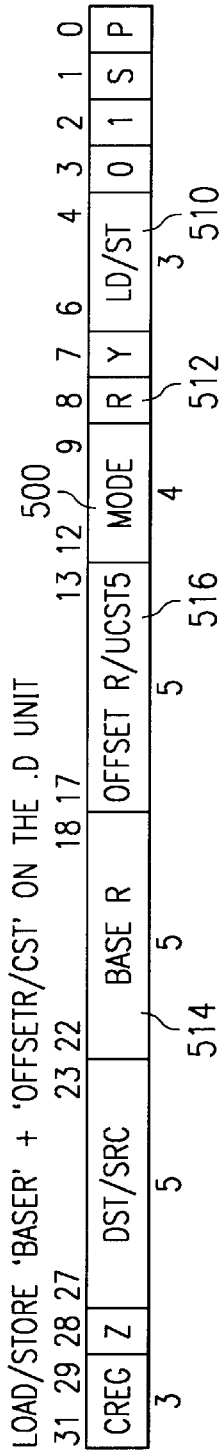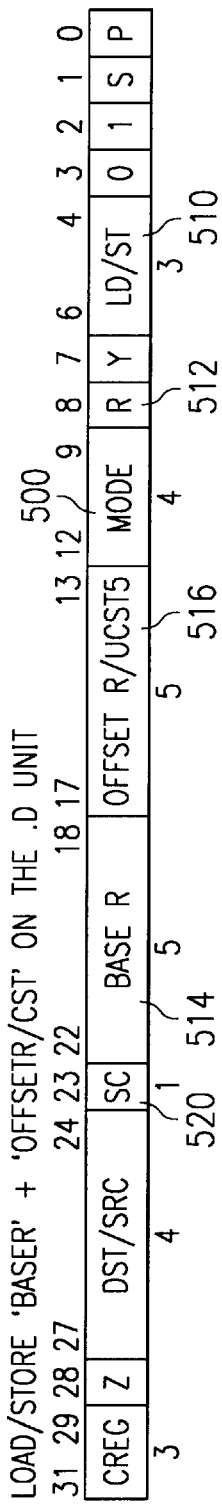

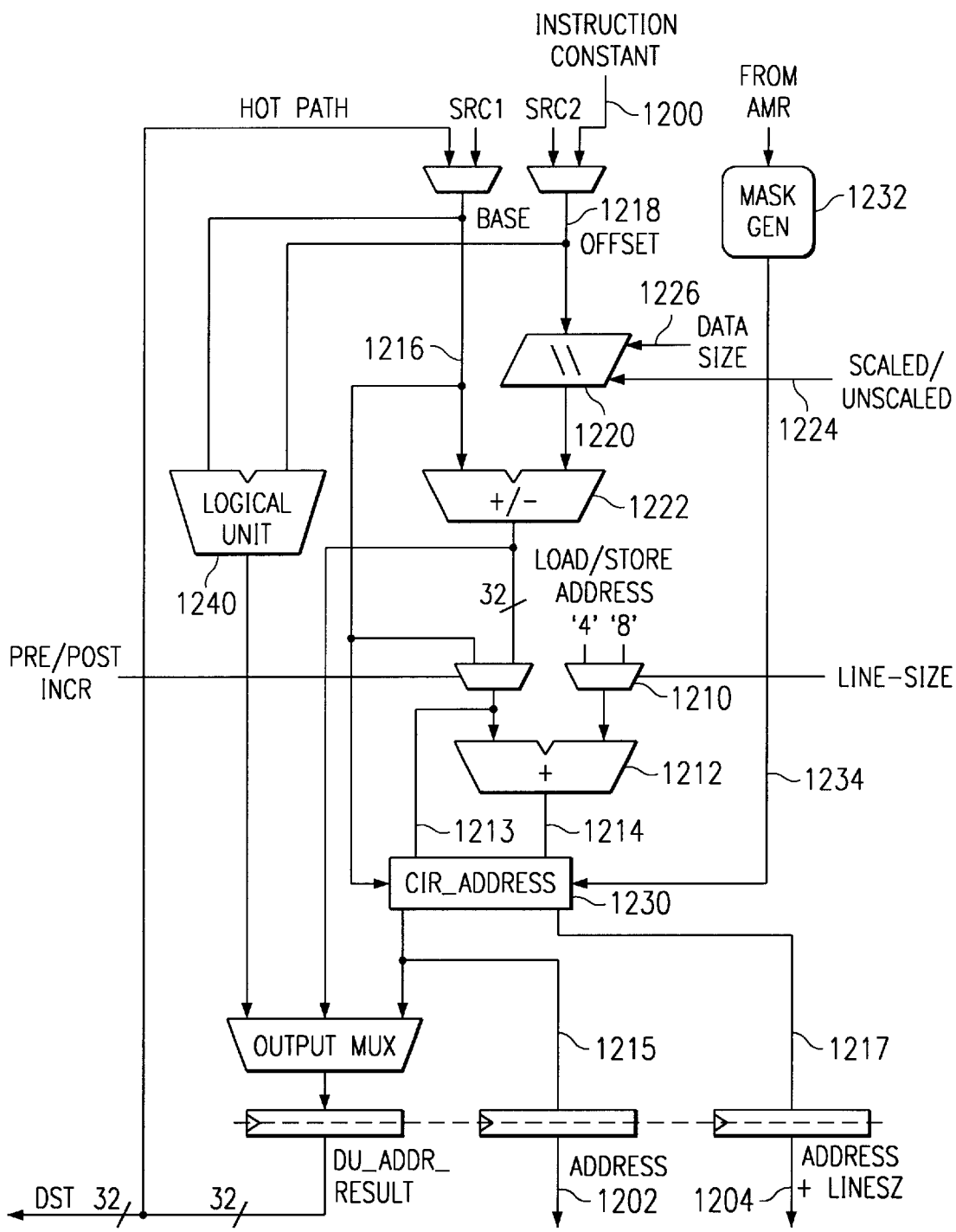

MICROPROCESSOR WITH NON-ALIGNED SCALED AND UNSCALED ADDRESSING

This application claims priority under 35 USC §119(e)(1) of Provisional Application No. 60/183,527, filed Feb. 18, 2000 and of Provisional Application No. 60/183,417, filed Feb. 18, 2000.

NOTICE (C) Copyright 2000 Texas Instruments Incorporated. A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

TECHNICAL FIELD OF THE INVENTION

This invention relates to data processing devices, electronic processing and control systems and methods of their manufacture and operation, and particularly relates to memory access schemes of microprocessors optimized for digital signal processing.

BACKGROUND OF THE INVENTION

Generally, a microprocessor is a circuit that combines the instruction-handling, arithmetic, and logical operations of a computer on a single semiconductor integrated circuit. Microprocessors can be grouped into two general classes, namely general-purpose microprocessors and special-purpose microprocessors. General-purpose microprocessors are designed to be programmable by the user to perform any of a wide range of tasks, and are therefore often used as the central processing unit (CPU) in equipment such as personal computers. Special-purpose microprocessors, in contrast, are designed to provide performance improvement for specific predetermined arithmetic and logical functions for which the user intends to use the microprocessor. By knowing the primary function of the microprocessor, the designer can structure the microprocessor architecture in such a manner that the performance of the specific function by the special-purpose microprocessor greatly exceeds the performance of the same function by a general-purpose microprocessor regardless of the program implemented by the user.

One such function that can be performed by a special-purpose microprocessor at a greatly improved rate is digital signal processing. Digital signal processing generally involves the representation, transmission, and manipulation of signals, using numerical techniques and a type of special-purpose microprocessor known as a digital signal processor (DSP). Digital signal processing typically requires the manipulation of large volumes of data, and a digital signal processor is optimized to efficiently perform the intensive computation and memory access operations associated with this data manipulation. For example, computations for performing Fast Fourier Transforms (FFTs) and for implementing digital filters consist to a large degree of repetitive operations such as multiply-and-add and multiple-bit-shift. DSPs can be specifically adapted for these repetitive functions, and provide a substantial performance improvement over general-purpose microprocessors in, for example, real-time applications such as image and speech processing.

DSPs are central to the operation of many of today's electronic products, such as high-speed modems, high-density disk drives, digital cellular phones, complex automotive systems, and video-conferencing equipment. DSPs will enable a wide variety of other digital systems in the future, such as video-phones, network processing, natural speech interfaces, and ultra-high speed modems. The demands placed upon DSPs in these and other applications continue to grow as consumers seek increased performance from their digital products, and as the convergence of the communications, computer and consumer industries creates completely new digital products.

Microprocessor designers have increasingly endeavored to exploit parallelism to improve performance. One parallel architecture that has found application in some modern microprocessors utilizes multiple instruction fetch packets and multiple instruction execution packets with multiple functional units, referred to as a Very Long Instruction Word (VLIW) architecture.

Digital systems designed on a single integrated circuit are referred to as an application specific integrated circuit (ASIC). MegaModules are being used in the design of ASICs to create complex digital systems a single chip. (MegaModule is a trademark of Texas Instruments Incorporated.) Types of MegaModules include SRAMs, FIFOs, register files, RAMs, ROMs, universal asynchronous receiver-transmitters (UARTs), programmable logic arrays and other such logic circuits. MegaModules are usually defined as integrated circuit modules of at least 500 gates in complexity and having a complex ASIC macro function. These MegaModules are predesigned and stored in an ASIC design library. The MegaModules can then be selected by a designer and placed within a certain area on a new IC chip.

Designers have succeeded in increasing the performance of DSPs, and microprocessors in general, by increasing clock speeds, by removing data processing bottlenecks in circuit architecture, by incorporating multiple execution units on a single processor circuit, and by developing optimizing compilers that schedule operations to be executed by the processor in an efficient manner. For example, non-aligned data access is provided on certain microprocessors. Complex instruction set computer (CISC) architectures (Intel, Motorola 68K) have thorough support for non-aligned data accesses; however, reduced instruction set computer (RISC) architectures do not have non-aligned accesses at all. Some RISC architectures allow two data accesses per cycle, but they allow only two aligned accesses. Certain CISC machines now allow doing two memory accesses per cycle as two non-aligned accesses. A reason for this is that the dual access implementations are superscalar implementations that are running code compatible with earlier scalar implementations.

The increasing demands of technology and the marketplace make desirable even further structural and process improvements in processing devices, application systems and methods of operation and manufacture.

SUMMARY OF THE INVENTION

An illustrative embodiment of the present invention seeks to provide a microprocessor and a method for accessing memory by a microprocessor that improves digital signal processing performance. Aspects of the invention are specified in the claims.

In an embodiment of the present invention, each .D unit of a DSP can load and store double words (64 bits) at aligned addresses. The .D units can also access words and double words on any byte boundary. Address generation circuitry in the .D units is operable to form an address for non-aligned double word instructions by combining a base address value and an offset value such that the offset value is selectively scaled or not scaled. The address circuitry is responsive to an SC bit field in the load or store (LD/ST) non-aligned double word instructions, such that when the SC field has a value of "1" the offset is scaled, and when the SC field has a value of "0" the offset is not scaled.

For other load or store instructions, the offset is scaled according to the type of instruction: LD/ST double word instruction is scaled by shifting the offset three bits; LD/ST word instruction is scaled by shifting the offset two bits; LD/ST half word instruction is scaled by shifting the offset one bit. LD/ST byte instruction is scaled by not shifting the offset, since the offset is treated as a byte offset.

BRIEF DESCRIPTION OF THE DRAWINGS

Other features and advantages of the present invention will become apparent by reference to the following detailed description when considered in conjunction with the accompanying drawings in which the Figures relate to the processor of FIG. 1 unless otherwise stated, and in which:

FIG. 3 illustrates the register storage scheme for 40-bit data of the DSP;

FIG. 4 illustrates an opcode map for the load/store instructions of the DSP;

FIG. 5 illustrates an opcode map for the load/store double, non-aligned instruction of the DSP;

FIG. 12 is a more detailed block diagram of the D-unit of the DSP; and

Corresponding numerals and symbols in the different figures and tables refer to corresponding parts unless otherwise indicated.

DETAILED DESCRIPTION OF EMBODIMENTS OF THE INVENTION

Figure 1:
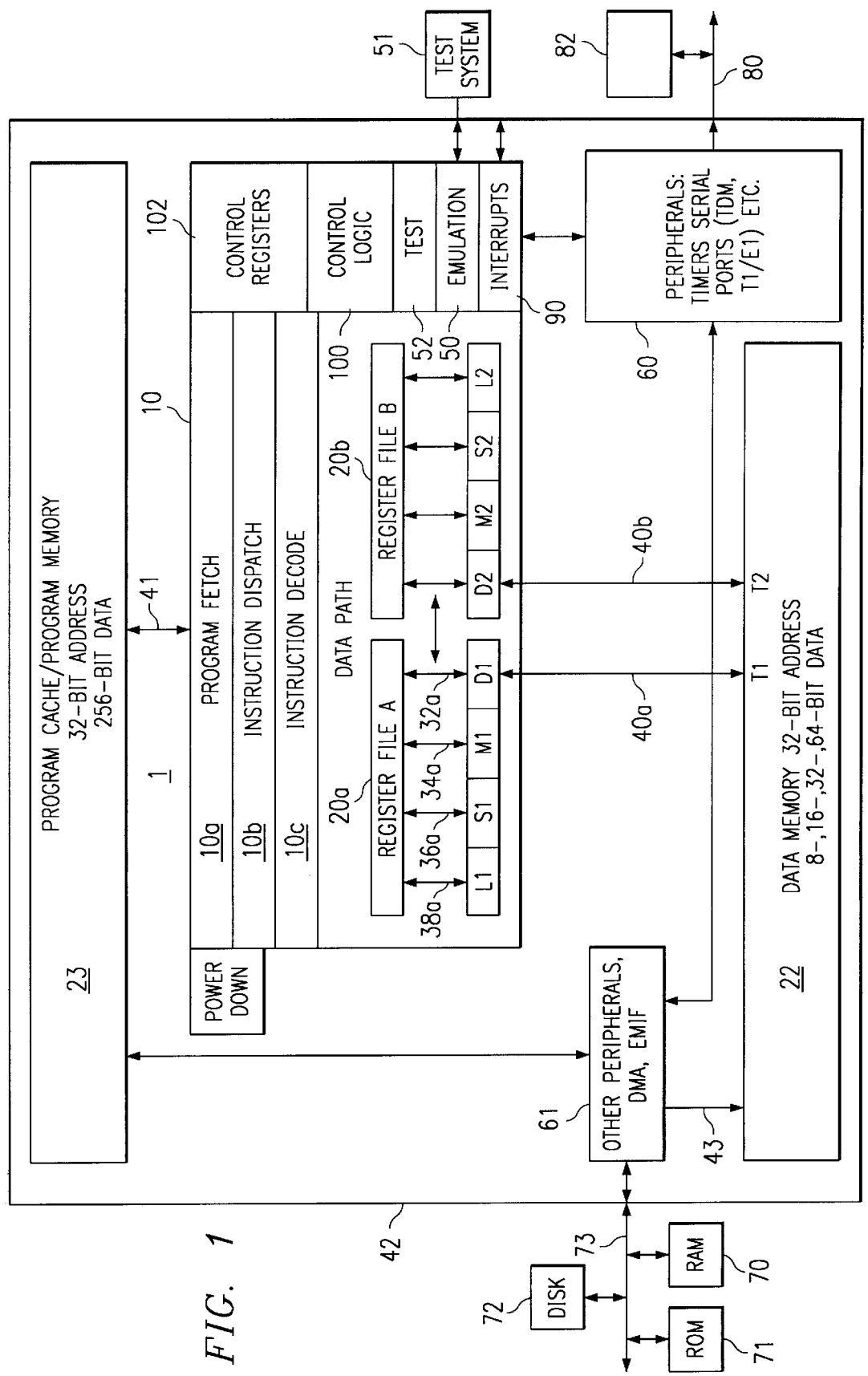
FIG. 1 is a block diagram of a digital system with a digital signal processor (DSP), showing components thereof pertinent to an embodiment of the present invention.

FIG. 1 is a block diagram of a microprocessor 1 that has an embodiment of the present invention. Microprocessor 1 is a RISC VLIW digital signal processor ("DSP"). In the interest of clarity, FIG. 1 only shows those portions of microprocessor 1 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor 1 relevant to an embodiment of the present invention are explained in sufficient detail hereinbelow, so as to enable one of ordinary skill in the microprocessor art to make and use the invention.

In microprocessor 1 there are shown a central processing unit (CPU) 10, data memory 22, program memory/cache 23, peripherals 60 and an external memory interface (EMIF) with a direct memory access (DMA) 61. CPU 10 further has an instruction fetch/decode unit 10a–c, a plurality of execution units, including an arithmetic and load/store unit D1, a multiplier M1, an ALU/shifter unit S1, an arithmetic logic unit ("ALU") L1, a shared multiport register file 20a from which data are read and to which data are written. Instructions are fetched by fetch unit 10a from instruction memory 23 over a set of busses 41. Decoded instructions are provided from the instruction fetch/decode unit 10a–c to the functional units D1, M1, S1, and L1 over various sets of control lines which are not shown. Data are provided to/from the register file 20a from/to to load/store units D1 over a first set of busses 32a, to multiplier M1 over a second set of busses 34a, to ALU/shifter unit S1 over a third set of busses 36a and to ALU L1 over a fourth set of busses 38a. Data are provided to/from the memory 22 from/to the load/store units D1 via a fifth set of busses 40a. Note that the entire data path described above is duplicated with register file 20b and execution units D2, M2, S2, and L2. In this embodiment of the present invention, two unrelated aligned double word (64 bits) load/store transfers can be made in parallel between CPU 10 and data memory 22 on each clock cycle using bus set 40a and bus set 40b. A single non-aligned double word load/store transfer is performed by scheduling a first .D unit resource and two load/store ports on a target memory. Advantageously, a second .D unit can perform 32-bit logical or arithmetic instructions in addition to the .S and .L units while the address port of the second .D unit is being used to transmit one of two contiguous addresses provided by the first .D unit.

Emulation circuitry 50 provides access to the internal operation of integrated circuit 1 that can be controlled by an external test/development system (XDS) 51. External test system 51 is representative of a variety of known test systems for debugging and emulating integrated circuits. One such system is described in U.S. Pat. No. 5,535,331 which is incorporated herein by reference. Test circuitry 52 contains control registers and parallel signature analysis circuitry for testing integrated circuit 1.

Note that the memory 22 and memory 23 are shown in FIG. 1 to be a part of a microprocessor 1 integrated circuit, the extent of which is represented by the box 42. The memories 22–23 could just as well be external to the microprocessor 1 integrated circuit 42, or part of it could reside on the integrated circuit 42 and part of it be external to the integrated circuit 42. These are matters of design choice. Also, the particular selection and number of execution units are a matter of design choice, and are not critical to the invention.

When microprocessor 1 is incorporated in a data processing system, additional memory or peripherals may be connected to microprocessor 1, as illustrated in FIG. 1. For example, Random Access Memory (RAM) 70, a Read Only Memory (ROM) 71 and a Disk 72 are shown connected via an external bus 73. Bus 73 is connected to the External Memory Interface (EMIF) which is part of functional block 61 within microprocessor 1. A Direct Memory Access (DMA) controller is also included within block 61. The DMA controller is generally used to move data between memory and peripherals within microprocessor 1 and memory and peripherals which are external to microprocessor 1.

A detailed description of various architectural features of the microprocessor 1 of FIG. 1 is provided in coassigned U.S. patent application Ser. No. 09/012,813 and is incorporated herein by reference. A description of enhanced architectural features and an extended instruction set not described herein for CPU 10 is provided in coassigned U.S. Patent application Ser. No. 60/183,527, (now abandoned) and converted to Non-Provisional patent application Ser. No. 09/703,096 Microprocessor with Improved instruction Set Architecture) and is incorporated herein by reference.

Figure 2:
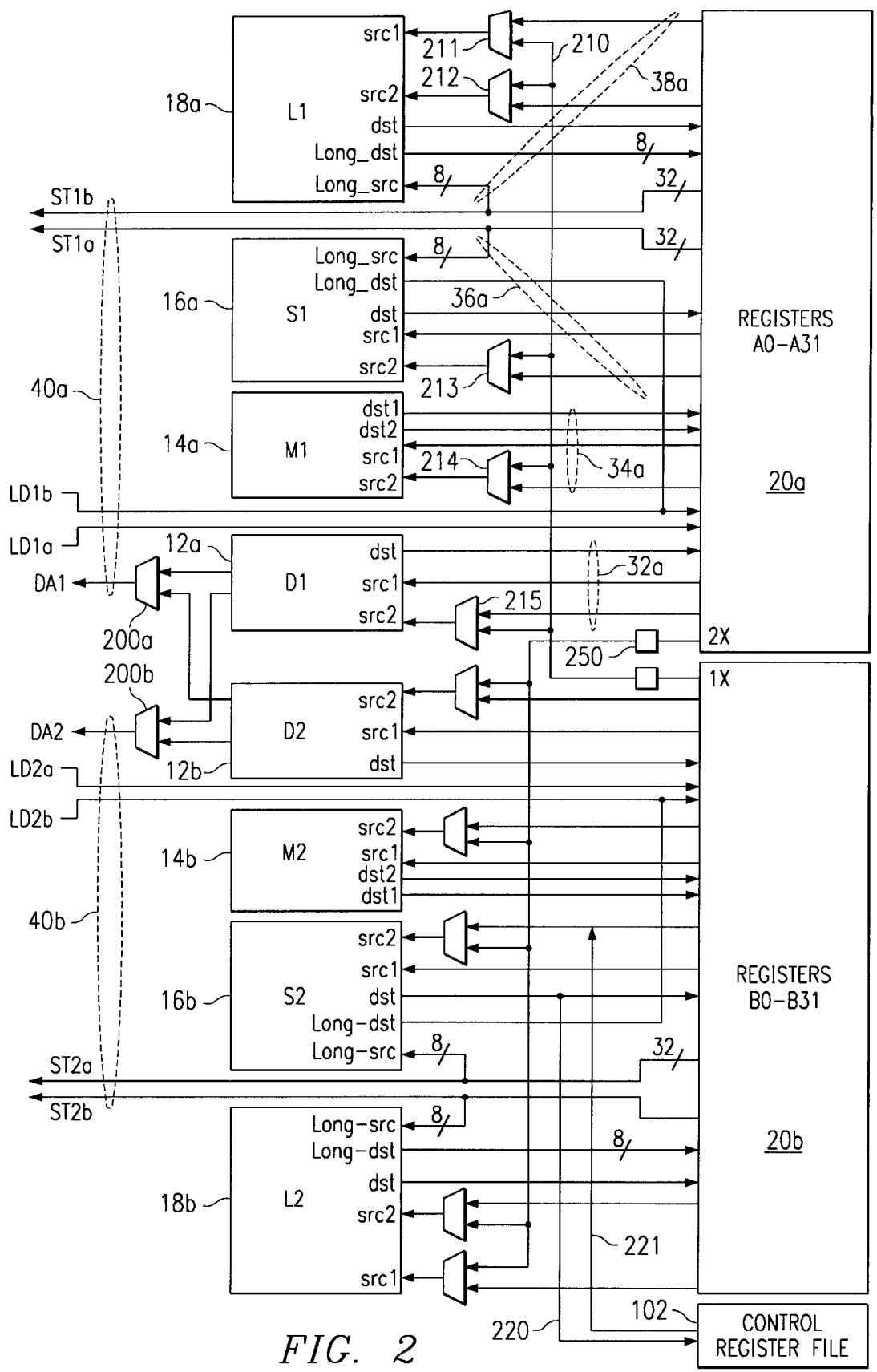
FIG. 2 is a block diagram of the functional units, data paths and register files of the DSP.

FIG. 2 is a block diagram of the execution units and register files of the microprocessor of FIG. 1 and shows a more detailed view of the buses connecting the various functional blocks. In this figure, all data busses are 32 bits wide, unless otherwise noted. There are two general-purpose register files (A and B) in the processor's data paths. Each of these files contains 32 32-bit registers (A0–A31 for file A and B0–B31 for file B). The general-purpose registers can be used for data, data address pointers, or condition registers. Any number of reads of a given register can be performed in a given cycle.

The general-purpose register files support data ranging in size from packed 8-bit data through 64-bit fixed-point data. Values larger than 32 bits, such as 40-bit long and 64-bit double word quantities, are stored in register pairs, with the 32 LSBs of data placed in an even-numbered register and the remaining 8 or 32 MSBs in the next upper register (which is always an odd-numbered register). Packed data types store either four 8-bit values or two 16-bit values in a single 32-bit register.

There are 32 valid register pairs for 40-bit and 64-bit data, as shown in Table 1. In assembly language syntax, a colon between the register names denotes the register pairs and the odd numbered register is specified first.

All eight of the functional units have access to the opposite side's register file via a cross path. The .M1, .M2, .S1, .S2, .D1 and .D2 units' src2 inputs are selectable between the cross path and the same side register file by appropriate selection of multiplexers 213, 214 and 215, for example. In the case of the .L1 and .L2 both src1 and src2 inputs are also selectable between the cross path and the same-side register file by appropriate selection of multiplexers 211, 212, for example.

TABLE 1

| 40-Bit/64-Bit Register Pairs Register Files | |
|---|---|
| A | B |
| A1:A0 | B1:B0 |
| A3:A2 | B3:B2 |
| A5:A4 | B5:B4 |
| A7:A6 | 67:B6 |
| A9:A8 | B9:B8 |

TABLE 1-continued

| 40-Bit/64-Bit Register Pairs Register Files | |
|---|---|
| A | B |
| A11:A10 | B11:B10 |
| A13:A12 | B13:B12 |
| A15:A14 | B15:B14 |
| A17:A16 | B17:B16 |
| A19:A18 | B19:B18 |
| A21:A20 | B21:B20 |
| A23:A22 | B23:B22 |
| A25:A24 | B25:B24 |
| A27:A26 | B27:B26 |
| A29:A28 | B29:B28 |
| A31:A30 | B31:B30 |

FIG. 3 illustrates the register storage scheme for 40-bit data. Operations requiring a long input ignore the 24 MSBs of the odd register. Operations producing a long result zero-fill the 24 MSBs of the odd register. The even register is encoded in the opcode.

Referring again to FIG. 2, the eight functional units in processor 10's data paths can be divided into two groups of four; each functional unit in one data path is almost identical to the corresponding unit in the other data path. The functional units are described in Table 2.

Besides being able to perform 32-bit data manipulations, processor 10 also contains many 8-bit and 16-bit data instructions in the instruction set. For example, the MPYU4 instruction performs four 8×8 unsigned multiplies with a single instruction on an M unit. The ADD4 instruction performs four 8-bit additions with a single instruction on an L unit.

TABLE 2

| Functional Units and Operations Performed | |
|---|---|
| Functional Unit | Fixed-Point Operations |
| .L unit (.L1, .L2), 18a,b | 32/40-bit arithmetic and compare operations |
| | 32-bit logical operations |
| | Leftmost 1 or 0 counting for 32 bits |
| | Normalization count for 32 and 40 bits |
| | Byte shifts |
| | Data packing/unpacking |
| | 5-bit constant generation |
| | Paired 16-bit arithmetic operations |
| | Quad 8-bit arithmetic operations |
| | Paired 16-bit min/max operations |
| | Quad 8-bit min/max operations |
| .S unit (.S1, .S2) 16a,b | 32-bit arithmetic operations |
| | 32,40-bit shifts and 32-bit bit-field operations |
| | 32-bit logical operations |
| | Branches |
| | Constant generation |
| | Register transfers to/from control register file (.S2 only) |
| | Byte shifts |
| | Data packing/unpacking |
| | Paired 16-bit compare operations |
| | Quad 8-bit compare operations |
| | Paired 16-bit shift operations |
| | Paired 16-bit saturated arithmetic operations |
| | Quad 8-bit saturated arithmetic operations |
| .M unit (.M1, .M2) 14a,b | 16 × 16 multiply operations |
| | 16 × 32 multiply operations |
| | Bit expansion |
| | Bit interleaving/de-interleaving |
| | Quad 8 × 8 multiply operations |
| | Paired 16 × 16 multiply operations |

TABLE 2-continued

Functional Units and Operations Performed

| Functional Unit | Fixed-Point Operations |
|---|---|
| | Paired 16 × 16 multiply with add/subtract operations |
| | Quad 8 × 8 multiply with add operations |
| | Variable shift operations |
| | Rotation |
| | Galois Field Multiply |
| D unit (.D1, .D2) 12a,b | 32-bit add, subtract, linear and circular address calculation |
| | Loads and stores with 5-bit constant offset |
| | Loads and stores with 15-bit constant offset (.D2 only) |
| | Load and store double words with 5-bit constant |
| | Load and store non-aligned words and double words |
| | 5-bit constant generation |
| | 32-bit logical operations |

Most data lines in the CPU support 32-bit operands, and some support long (40-bit) and double word (64-bit) operands. Each functional unit has its own 32-bit write port into a general-purpose register file 20a, 20b (Refer to FIG. 2). All units ending in 1 (for example, .L1) write to register file A 20a and all units ending in 2 write to register file B 20b. Each functional unit has two 32-bit read ports for source operands src1 and src2. Four units (.L1, .L2, .S1, and .S2) have an extra 8-bit-wide port (long-dst) for 40-bit long writes, as well as an 8-bit input (long-src) for 40-bit long reads. Because each unit has its own 32-bit write port dst, when performing 32 bit operations all eight units can be used in parallel every cycle. Since each multiplier can return up to a 64-bit result, two write ports (dst1 and dst2) are provided from the multipliers to the register file.

Memory, Load and Store Paths

Processor 10 supports double word loads and stores. There are four 32-bit paths for loading data for memory to the register file. For side A, LD1a is the load path for the 32 LSBs (least significant bits); LD1b is the load path for the 32 MSBs (most significant bits). For side B, LD2a is the load path for the 32 LSBs; LD2b is the load path for the 32 MSBs. There are also four 32-bit paths, for storing register values to memory from each register file. ST1a is the write path for the 32 LSBs on side A; ST1b is the write path for the 32 MSBs for side A. For side B, ST2a is the write path for the 32 LSBs; ST2b is the write path for the 32 MSBs.

The ports for long and double word operands are shared between the S and L functional units. This places a constraint on which long or double word operations can be scheduled on a datapath in the same execute packet.

Data Address Paths

Bus 40a has an address bus DA1 which is driven by mux 200a. This allows an address generated by either load/store unit D1 or D2 to provide a memory address for loads or stores for register file 20a. Data Bus LD1a,b loads data from an address in memory 22 specified by address bus DA1 to a register in register file 20a. Likewise, data bus ST1a,b stores data from register file 20a to memory 22. Load/store unit D1 performs the following operations: 32-bit add, subtract, linear and circular address calculations. Load/store unit D2 operates similarly to unit D1, with the assistance of mux 200b for selecting an address.

The DA1 and DA2 address resources and their associated data paths are connected to target memory ports on memory 22 specified as T1 and T2 respectively. T1 connects to the DA1 address path and the LD1a, LD1b, ST1a and ST1b data paths. Similarly, T2 connects to the DA2 address path and the LD2a, LD2b, ST2a and ST2b data paths. The T1 and T2 designations appear in functional unit fields for load and store instructions.

For example, the following load instruction uses the .D1 unit to generate the address but is using the LD2a path resource with DA2 address bus connected to target port T2 to place the data in the B register file: LDW .D1T2 *A0[3], B1. The use of the DA2 address resource is indicated with the T2 designation.

Instruction Syntax

An instruction syntax is used to describe each instruction. An opcode map breaks down the various bit fields that make up each instruction. There are certain instructions that can be executed on more than one functional unit. The syntax specifies the functional unit and various resources used by an instruction, and typically has a form as follows: operation, unit, src, dst. src and dst indicate source and destination operands respectively. The unit dictates which functional unit the instruction is mapped to (.L1, .L2, .S1, .S2, .M1, .M2, .D1, or .D2). Several instructions have three opcode operand fields: src1, src2, and dst.

FIG. 4 illustrates a load/store instruction opcode map. FIG. 5 illustrates an opcode map for other non-aligned double word load/store instructions. Table 3 lists the opcodes for various load store (LD/ST) instructions performed by the CPU of the present embodiment. Opcode field 510 and R-field 512 define the operation of the LD/ST instructions. An aspect of the present invention is that processor 10 performs non-aligned load and store instructions by using resources of one D unit and both target ports T1 and T2, as will be described in more detail below. Advantageously, the second D unit is available to execute a Boolean or arithmetic instruction in parallel with the execution of a non-aligned load/store instruction.

The dst field of the LD/STNDW instruction selects a register pair, a consecutive even-numbered and odd-numbered register pair from the same register file. The instruction can be used to load a pair of 32-bit integers. The least significant 32 bits are loaded into the even-numbered register and the most significant 32 bits are loaded into the next register (which is always an odd-numbered register).

TABLE 3

Load/Store Instruction Opcodes

| R-Opcode extension | LD/ST Op | Instruction | Size | Alignment |
|---|---|---|---|---|
| 0 | 000 | LDHU | Half word unsigned | Half word |
| 0 | 001 | LDBU | Byte unsigned | Byte |
| 0 | 010 | LDB | Byte | Byte |
| 0 | 011 | STB | Byte | Byte |
| 0 | 100 | LDH | Half word | Half word |
| 0 | 101 | STH | Half word | Half word |
| 0 | 110 | LDW | Word | Word |
| 0 | 111 | STW | Word | Word |
| 1 | 010 | LDNDW | Double word | Byte (non-aligned) |
| 1 | 011 | LDNW | Word | Byte (non-aligned) |
| 1 | 100 | STDW | Double word | Double word |
| 1 | 101 | STNW | Word | Byte (non-aligned) |
| 1 | 110 | LDDW | Double word | Double word |
| 1 | 111 | STNDW | Double word | Byte (non-aligned) |

In this embodiment, instructions are always fetched eight at a time. This constitutes a fetch packet. The execution grouping of the fetch packet is specified by the p-bit, bit zero, of each instruction. Fetch packets are 8-word aligned and can contain up to eight instructions. A p bit in each instruction controls the parallel execution of instructions. A set of instructions executing in parallel constitute an execute packet. An execute packet can contain up to eight instructions.

Addressing Modes

The addressing modes are linear, circular using block size field BK0, and circular using block size field BK1. Eight registers can perform circular addressing. A4–A7 are used by the .D1 unit and B4–B7 are used by the .D2 unit. No other units can perform circular addressing modes. For each of these registers, an addressing mode register (AMR) contained in control register file 102 specifies the addressing mode. The block size fields are also in the AMR. A detailed description of circular addressing is provided in coassigned U.S. patent Ser. No. 09/703,105 entitled Microprocessor With Non-Aligned Load/Store Memory Access, and is incorporated herein by reference.

Referring again to FIG. 4 and 5, linear mode addressing simply shifts the offsetR/cst operand to the left by 3, 2, 1, or 0 for double word, word, half-word, or byte access respectively and then performs an add or subtract to baseR, depending on the address mode specified. For the pre-increment, pre-decrement, positive offset, and negative offset address generation options, the result of the calculation is the address to be accessed in memory. For post-increment or post-decrement addressing, the value of baseR before the addition or subtraction is the address to be accessed from memory. Address modes are specified by mode field 500 and listed in Table 4. The increment/decrement mode controls whether the updated address is written back to the register file. Otherwise, it is rather similar to offset mode. The pre-increment and offset modes differ. only in whether the result is written back to "base". The post-increment mode is similar to pre-increment (e.g. the new address is written to "base"), but differs in that the old value of "base" is used as the address for the access. The same applies for negative offset vs. decrement mode.

the same relative pipeline phase difference; and load and store addresses appear on the CPU boundary during the same pipeline phase, eliminating read-after-write memory conflicts.

A multi-stage memory pipeline is present for both data accesses in memory 22 and program fetches in memory 23. This allows use of high-speed synchronous memories both on-chip and off-chip, and allows infinitely nestable zero-overhead looping with branches in parallel with other instructions.

There are no internal interlocks in the execution cycles of the pipeline, so a new execute packet enters execution every CPU cycle. Therefore, the number of CPU cycles for a particular algorithm with particular input data is fixed. If during program execution, there are no memory stalls, the number of CPU cycles equals the number of clock cycles for a program to execute.

Performance can be inhibited only by stalls from the memory subsystems or interrupts. The reasons for memory stalls are determined by the memory architecture. To fully understand how to optimize a program for speed, the sequence of program fetch, data store, and data load requests the program makes, and how they might stall the CPU should be understood.

The pipeline operation, from a functional point of view, is based on CPU cycles. A CPU cycle is the period during which a particular execute packet is in a particular pipeline stage. CPU cycle boundaries always occur at clock cycle boundaries; however, memory stalls can cause CPU cycles to extend over multiple clock cycles. To understand the machine state at CPU cycle boundaries, one must be concerned only with the execution phases (E1–E5) of the pipeline. The phases of the pipeline are described in Table 5.

TABLE 4

Address Generator Options

| Mode Field | Syntax | Modification Performed |
| --- | --- | --- |
| 0 1 0 1 | *+R[offsetR] | Positive offset; addr = base + offset * scale |
| 0 1 0 0 | *-R[offsetR] | Negative offset; addr = base - offset * scale |
| 1 1 0 1 | *++R[offsetR] | Preincrement; addr = base + offset * scale; base = addr |
| 1 1 0 0 | *-R[offsetR] | Predecrement; addr = base - offset * scale; base = addr |
| 1 1 1 1 | *R++[offsetR] | Postincrement; addr = base; base = base + offset * scale |
| 1 1 1 0 | *R-[offsetR] | Postdecrement; addr = base; base = base - offset * scale |
| 0 0 0 1 | *+R[ucst5] | Positive offset; addr = base + offset * scale |
| 0 0 0 0 | *-R[ucst5] | Negative offset; addr = base - offset * scale |
| 1 0 0 1 | *++R[ucst5] | Preincrement; addr = base + offset * scale; base = addr |
| 1 0 0 0 | *--R[ucst5] | Predecrement; addr = base - offset * scale; base = addr |
| 1 0 1 1 | *R++[ucst5] | Postincrement; addr = base; base = base + offset * scale |
| 1 0 1 0 | *R--[ucst5] | Postdecrement; addr = base; base = base - offset * scale |

Pipeline Operation

The instruction execution pipeline of DSP 1 has several key features which improve performance, decrease cost, and simplify programming, including: increased pipelining eliminates traditional architectural bottlenecks in program fetch, data access, and multiply operations; control of the pipeline is simplified by eliminating pipeline interlocks; the pipeline can dispatch eight parallel instructions every cycle; parallel instructions proceed simultaneously through the same pipeline phases; sequential instructions proceed with

TABLE 5

Pipeline Phase Description

| Pipeline | Pipeline Phase | Symbol | During This Phase | Instruction Types Completed |
|---|---|---|---|---|
| Program Fetch | Program Address Generate | PG | Address of the fetch packet is determined. | |
| | Program Address Send | PS | Address of fetch packet is sent to memory. | |
| | Program Wait | PW | Program memory access is performed. | |
| | Program Data Receive | PR | Fetch packet is expected at CPU boundary. | |
| Program Decode | Dispatch | DP | Next execute packet in fetch packet determined and sent to the appropriate functional units to be decoded. | |
| | Decode | DC | Instructions are decoded at functional units. | |
| Execute | Execute 1 | E1 | For all instruction types, conditions for instructions are evaluated and operands read. Load and store instructions: address generation is computed and address modifications written to register file† Branch instructions: affects branch fetch packet in PG phase† Single-cycle instructions: results are written to a register file† | Single-cycle |
| | Execute 2 | E2 | Load instructions: address is sent to memory† Store instructions and STP: address and data are sent to memory† Single-cycle instructions that saturate results set the SAT bit in the Control Status Register (CSR) if saturation occurs.† Multiply instructions: results are written to a register file† | Stores STP Multiplies |
| | Execute 3 | E3 | Data memory accesses are performed. Any multiply instruction that saturates results sets the SAT bit in the Control Status Register (CSR) if saturation occurs.† | |
| | Execute 4 | E4 | Load instructions: data is brought to CPU boundary† | |
| | Execute 5 | E5 | Load instructions: data is loaded into register† | Loads |

†This assumes that the conditions for the instructions are evaluated as true. If the condition is evaluated as false, the instruction will not write any results or have any pipeline operation after E1.

Load instructions have two results: data loaded from memory and address pointer modification.

Data loads complete their operations during the E5 phase of the pipeline. In the E1 phase, the address of the data is computed. In the E2 phase, the data address is sent to data memory. In the E3 phase, a memory read is performed. In the E4 stage, the data is received at the CPU core boundary. Finally, in the E5 phase, the data is loaded into a register. Because data is not written to the register until E5, these instructions have 4 delay slots. Because pointer results are written to the register in E1, there are no delay slots associated with the address modification.

Store instructions complete their operations during the E3 phase of the pipeline. In the E1 phase, the address of the data is computed. In the E2 phase, the data address is sent to data memory. In the E3 phase, a memory write is performed. The address modification is performed in the E1 stage of the pipeline.

As discussed earlier, non-aligned load and store instructions are performed by using resources of one D unit and both target ports T1 and T2, as will be described in more detail below. Advantageously, the second D unit is available to execute a Boolean or arithmetic instruction in parallel with the execution of a non-aligned load/store instruction. Aspects of non-aligned memory accesses will now be described in more detail.

Figure 6:
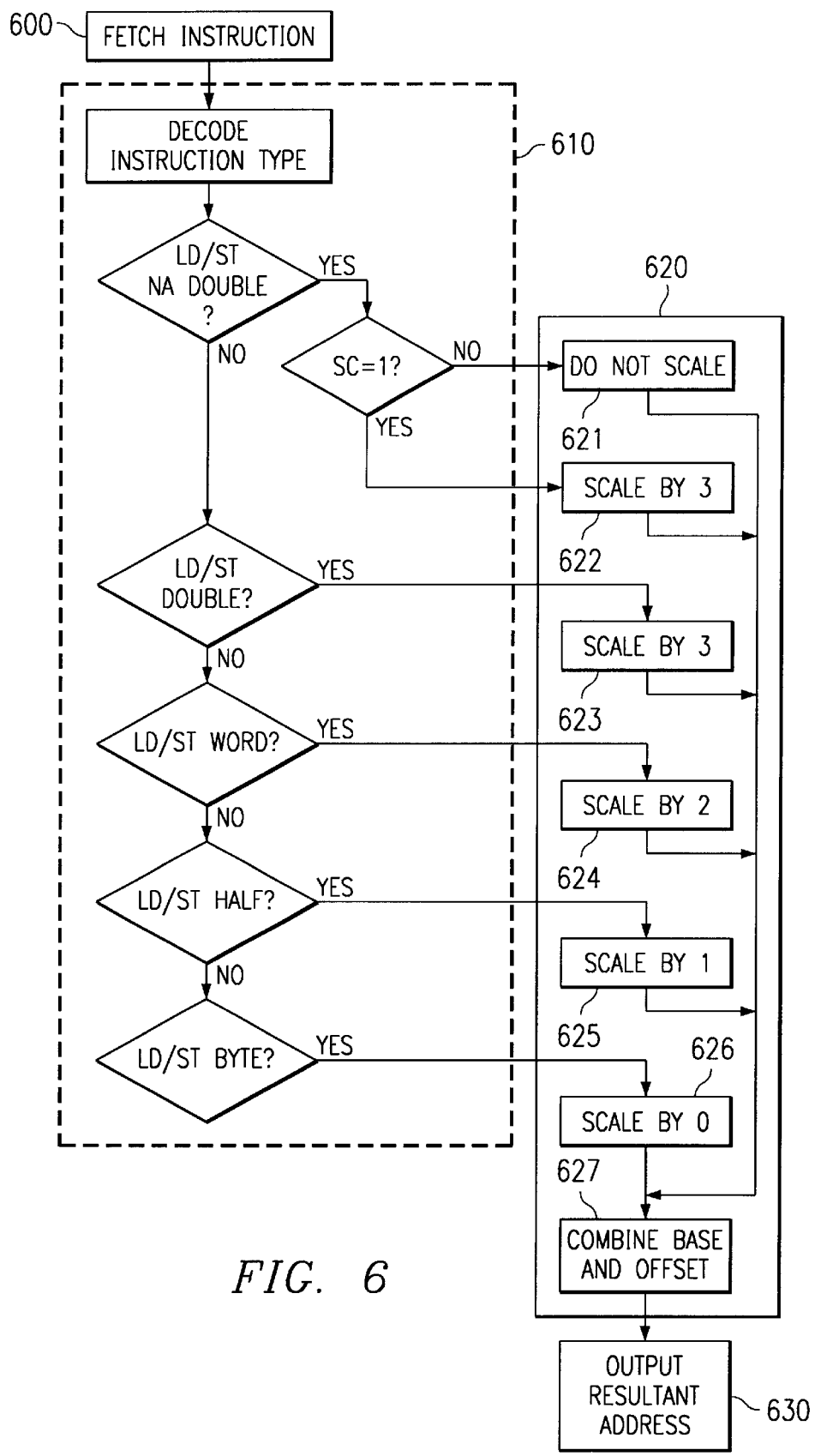
FIG. 6 is a flow chart illustrating formation of scaled and non-scaled address, according to an aspect of the present invention.

FIG. 6 is a flow chart illustrating formation of scaled and non-scaled address, according to an aspect of the present invention. In step 600, an instruction is fetched for execution. In this embodiment of the present invention, instructions are fetched in fetch packets of eight instructions simultaneously during instruction execution pipeline phases P/G, PS, PW and PR. Other embodiments of the present invention may fetch instructions singly or doubly, for example, in a different number of phases.

In step 610, the instruction is decoded to form a plurality of fields. In this embodiment, decoding is performed in two phases of the instruction execution pipeline, but in other embodiments of the present invention decoding may be performed on one or three or more phases. In step 620, an address for accessing a data item for the instruction is formed by combining in 627 a base address value and an offset value, such that the offset value is selectively scaled or not scaled. Step 627 may include post or pre-incrementing or decrementing of the base register as well, for example, as indicated by mode field 500. In 621 or 622, for a non-aligned double word load or store instruction (LD/STNDW) the offset value is scaled by shifting left three bits only if the SC field 520 has a value of 1. If SC field 520 has a value of 0, then the offset value is not scaled and is therefore treated as a byte offset. If the instruction is a load or store double, then the offset is scaled by left shifting three bits in step 623 to form a double word offset. If the instruction is a LD/ST word, then the offset is scaled by shifting left two bits in step 624 to form. a word offset. If the instruction is a half word LD/ST instruction, then the offset is scaled by shifting left one bit in step 625 to form a half word offset. If the instruction is a byte LD/ST instruction, then the offset is scaled by shifting zero bits in step 626 to form a byte offset. In the present embodiment, the scaling amount is determined by opcode field 510, 512 that specifies the type of LD/ST instruction. In another embodiment, there may be a field to specify operand size, for example. In the present embodiment, step 620 is performed during the E1 pipeline phase.

In step 630, the resultant address is sent to the memory subsystem during pipeline phase E2.

An assembler which supports this embodiment of the invention defaults increments and decrements to 1 and offsets to 0 if an offset register or constant is not specified. Loads that do not modify to the baseR can use the assembler syntax *R. Square brackets, [ ], indicate that the ucst5 offset is left-shifted by 3 for double word loads. Parentheses, ( ),are used to tell the assembler that the offset is a non-scaled offset. For example, LDNDW (.unit) *+baseR (14), dst represents an offset of 14 bytes and the assembler writes out the instruction with offsetC=14 and sc=0. Likewise, LDNDW (.unit) *+baseR [16] dst represents an offset of 16 double words, or 128 bytes, and the assembler writes out the instruction with offsetC=16 and sc=1.

In this embodiment, LD/STDW instructions do not include an SC field. However, parentheses, ( ), are used to tell the assembler that the offset is a non-scaled, constant offset. The assembler right shifts the constant by 3 bits for double word stores before using it for the ucst5 field. After scaling by the STDW instruction, this results in the same constant offset as the assembler source if the least significant three bits are zeros. For example, STDW (.unit) src, *+baseR (16) represents an offset of 16 bytes (2 double words), and the assembler writes out the instruction with ucst5 =2. STDW (.unit) src, *+baseR [16] represents an offset of 16 double words, or 128 bytes, and the assembler writes out the instruction with ucst5=16.

Referring again to step 620 of FIG. 6, the SC bit (scale or not scaled) affects pre/post incrementing. If a pre or post increment/decrement is specified, then the increment/decrement amount is controlled by the SC bit. In non-scaled mode, the increment/decrement corresponds to a number of bytes. In assembly code, this would be written as shown in Table 6, example 1 and 2. In both of these cases, reg1 ends up with the value "reg1+reg2".

In scaled mode, the increment/decrement corresponds to a number of double-words. The assembly syntax for this is shown in Table 6, examples 3 and 4. In both of these cases, reg1 ends up with the value "reg1+8*reg2". That is, reg2 is "scaled" by the size of the access.

These comments also apply to the integer offset modes as well, as illustrated in Table 6, examples 5–8. Likewise, similar examples apply to the pre/post decrement instructions.

TABLE 6

Examples of Instructions With Various Pre/Post Increment, Scaled and Non-Scaled

| Example | Instruction Syntax | Operation |
|---------|--------------------|-----------|
| 1 | LDNDW *++reg1(reg2), reg3 | pre-increment, non-scaled |
| 2 | LDNDW *reg1++(reg2), reg3 | post-increment, non-scaled |
| 3 | LDNDW *++reg1[reg2], reg3 | pre-increment, scaled. |
| 4 | LDNDW *reg1++[reg2], reg3 | post-increment, scaled. |
| 5 | LDNDW *++reg1(cst5), reg2 | pre-increment, non-scaled |
| 6 | LDNDW *reg1++(cst5), reg2 | post-increment, non-scaled |
| 7 | LDNDW *++reg1[cst5], reg2 | pre-increment, scaled |
| 8 | LDNDW *reg1++[cst5], reg2 | post-increment, scaled |

An advantage of scaled vs. non-scaled for the integer offset modes is that scaled provides a larger range of access whereas non-scaled provides finer granularity of access. Typically, when large offsets are used, they're multiples of the access size already. When small offsets are used, they're typically not, since typically a short moving distance is desired.

Scaled vs. non-scaled in register-offset modes is advantageous as well, but for different reasons. In scaled mode, the register offset usually corresponds to an array index of some sort. In non-scaled mode, the register offset may correspond to an image width or other stride parameter that isn't a multiple of the access width. For instance, accessing a 2 dimensional array whose row width is not a multiple of 8.

Figure 7:
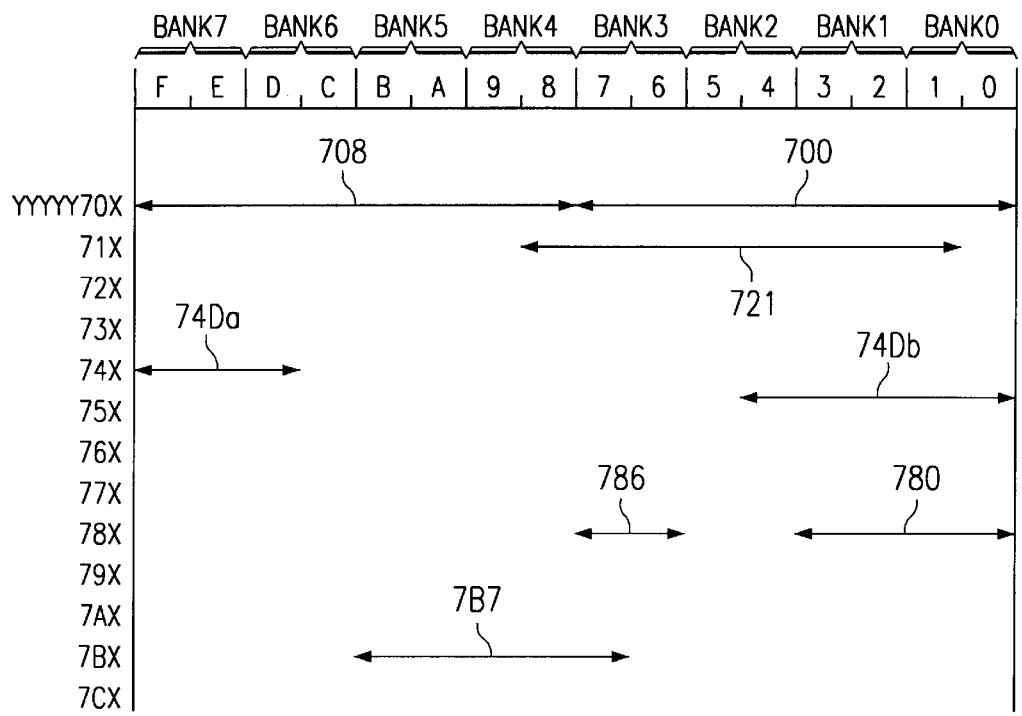
FIG. 7 is a memory map of a portion of the memory space of the DSP and illustrates various aligned and non-aligned memory accesses.

FIG. 7 is a memory map of a portion of the memory space of the DSP 1 and illustrates various aligned and non-aligned memory accesses. This portion of memory can be at any address YYYYYNNXh, but only the portion of the address represented by NNXh will be referred to herein, for convenience. Furthermore, the addresses used in the following discussion are only for example and are not intended to limit the invention in any manner.

DSP 1 can access both target ports T1, T2 of data memory 22 by executing two aligned load or store instructions in parallel, as discussed above. For example, a double word 700 at address 700h and a double word 708 at address 708h can be accessed by two load double word (LDDW) instructions executed in parallel using .D1 and .D2 and target ports T1 and T2. Likewise, word 780 and half word 786 can be accessed by executing a load word (LDW) instruction and a load half word (LDH) instruction in parallel using .D1 and .D2 and target ports T1 and T2.

Advantageously, this embodiment of the present invention utilizes the two target ports and two address buses DA1, DA2 to perform a non-aligned access. For example, double word 721 at address 721h is non-aligned by one byte. Double word 74Da–74Db at address 74Dh is located in two different rows of the memory. Single word 7B7 located at address 7B7h is non-aligned by three bytes. Advantageously, each non-aligned access is performed in the same amount of time as each aligned access, unless the data word is not present in memory 22 and must be retrieved from secondary memory storage, such as off-chip memory 70 of FIG. 1.

Uniform access time is important for software programs that operate in real time, such as are commonly executed on DSPs. The problem for real time comes when a loop walks a data structure by a stride related to the cache/SRAM line size. If the structure starts at an offset such that the unaligned access doesn't require access outside of the single line, the loop runs quickly since every access runs without the stall. If the starting offset is such that the nonaligned load crosses the line boundary, there is a stall on every access. The same loop might run twice as long this time. If a real-time system is designed for the longer loop time, then twice as much performance is being sacrificed most of the time.

Figure 8:
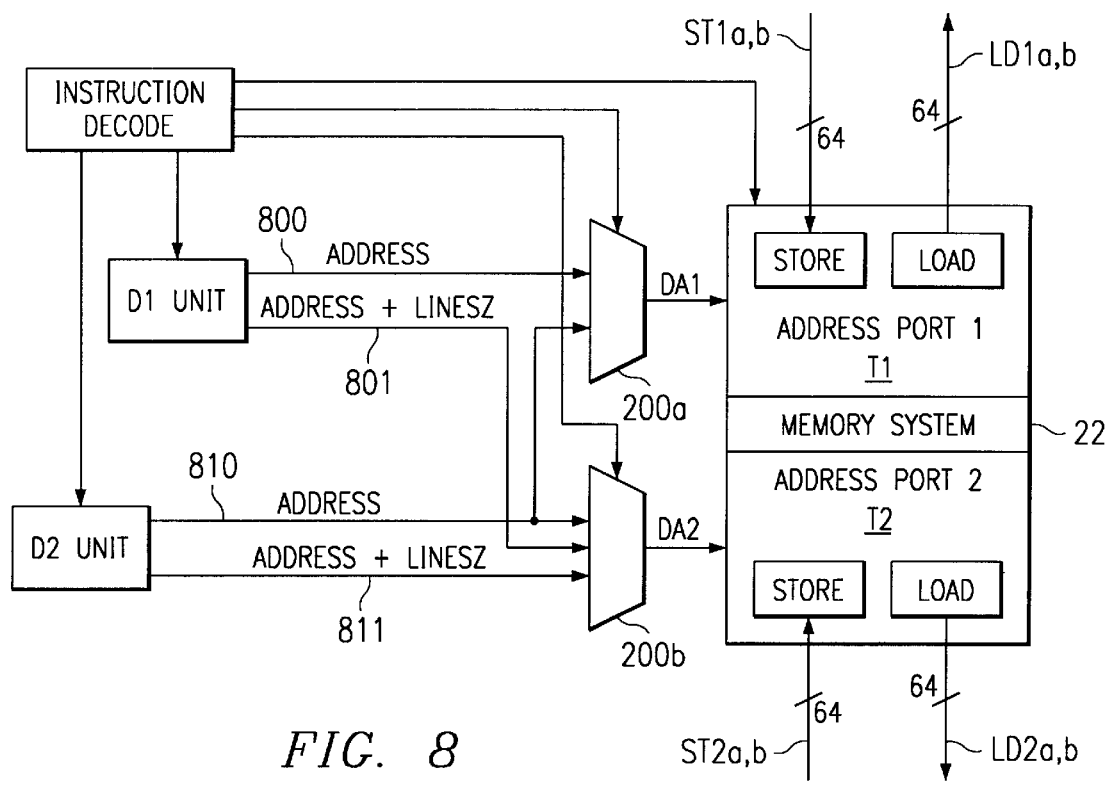
FIG. 8 is a block diagram illustrating D-unit address buses of the DSP in more detail and illustrating the two target ports of the DSP memory.

FIG. 8 is a block diagram illustrating D-unit address buses of DSP 1 in more detail and illustrating two target ports T1, T2 of DSP memory 22. An aspect of the embodiment of the present invention is that load/store unit .D1 can generate an address for a non-aligned access and provide it on address bus DA1 via address signals 800 and multiplexer 200a, and simultaneously generate a contiguous address that is greater by the data size and provide it on address bus DA2 via address signals 801 and multiplexer 200b. In this embodiment of the invention, load/store unit .D2 can also generate an address for a non-aligned access and simultaneously generate a contiguous address incremented by the data size and provide them to address buses DA1 and DA2 via address signal lines 810 and 811 and multiplexors 200*a* and 200*b*, respectively. However, in an alternative embodiment, only one load/store unit may be so equipped. In yet another embodiment, there may be more than two D units so equipped, for example.

In this embodiment of the invention, DSP 1 supports non-aligned memory loads and stores for words and double words. Only one non-aligned access can be performed in a single cycle because both target ports T1, T2 are used to load/store part of the data. From the memory designer's perspective, non-aligned accesses are transparent. The DSP simply requests an aligned access to each target port T1, T2 and byte strobes accompany data that must be written. Alternative embodiments of the present invention may support other data sizes for non-aligned access. An alternative embodiment of the present invention may provide the addresses in another form, such as a byte address without being truncated to the nearest word address, for example. Advantageously, memory 22 bank conflicts do not occur during non-aligned access.

Figure 9:
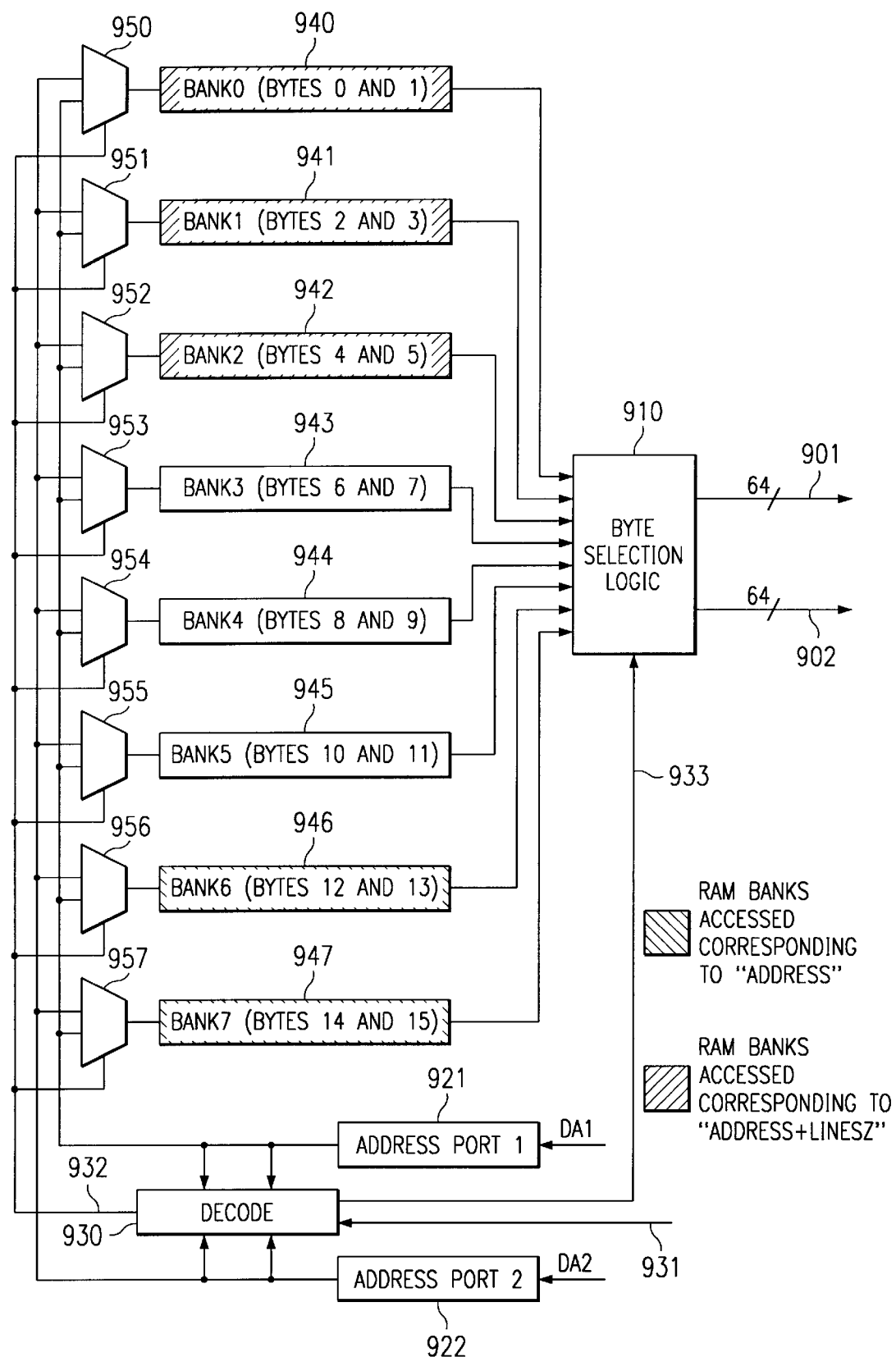
FIG. 9 is a block diagram of the memory of FIG. 8 illustrating address decoding of the two address ports and byte selection according to an embodiment of the present invention.

FIG. 9 is a block diagram of the memory of FIG. 8 illustrating address decoding of the two target ports T1, T2 and byte selection according to an embodiment of the present invention. Byte selection circuitry 910 selects data from a set of memory banks 940–947 and provides the selected data to load data signals 901 and to load data signals 902 that are connected respectively to load data buses LD1*a,b* and LD2*a,b*. In this embodiment of the present invention, there are eight memory banks 940–947 that each store sixteen bits of data, so that two sets of 64 bit data can be selected and provided on load data signals 901, 902. Address ports 921 and 922 each receive an address from address buses DA1 and DA2, respectively and provide a portion of the address to separate inputs on address multiplexers 950–957 that provide addresses to the memory banks. Decode circuitry 930 decodes a portion of the address MSBs to determine that a memory request is intended for memory 22. Decode signals 932 are formed by decoder 930 and sent to address multiplexors 950–957 to select which address is provided to each memory bank.

Decode circuitry 930 also receives a set of control signals 931 from instruction decode circuitry 10*c* of DSP 1 to identify if a non-aligned access is being processed by memory 22. In response to control signals 931 and four LSB address bits from each address bus DA1, DA2, decode circuitry 930 forms byte selection signals 933 that are sent to byte selection circuitry 910. When one or two aligned load requests are being executed, byte selection circuitry places the requested byte, half word, word or double word on the appropriate set of load data signals 901, 902 in a right aligned manner in response to byte selection signals 933.

When a non-aligned load request is being executed, byte selection circuitry 910 places the selected word or double word on the appropriate set of load data signals 901 or 902 in response to byte selection signals 933. For example, referring back to FIG. 7, for non-aligned double word access 74D, memory banks 946 and 947 are accessed at aligned address 748*h* provided on address bus DA1 and three bytes are selected corresponding to byte addresses 74Dh–74Fh. Memory banks 940, 941, and 942 are accessed at contiguous aligned address 750*h* provided on address bus DA2 and five bytes are selected corresponding to byte addresses 750*h*–754*h*. Note that the address provided on DA2 is a value of 8*h* greater than the aligned address on DA1, corresponding to the eight byte size of the requested non-aligned data item. These eight bytes are then right aligned and provided on load data signals 901 if register file A 20*a* is the specified destination of the transfer or on load signals 902 if register file 20*b* is the specified destination of the transfer. In this embodiment, the load data bus LDx that is not associated with the specified destination register file remains free so that an associated .S unit can use the shared register file write port.

Figure 10:
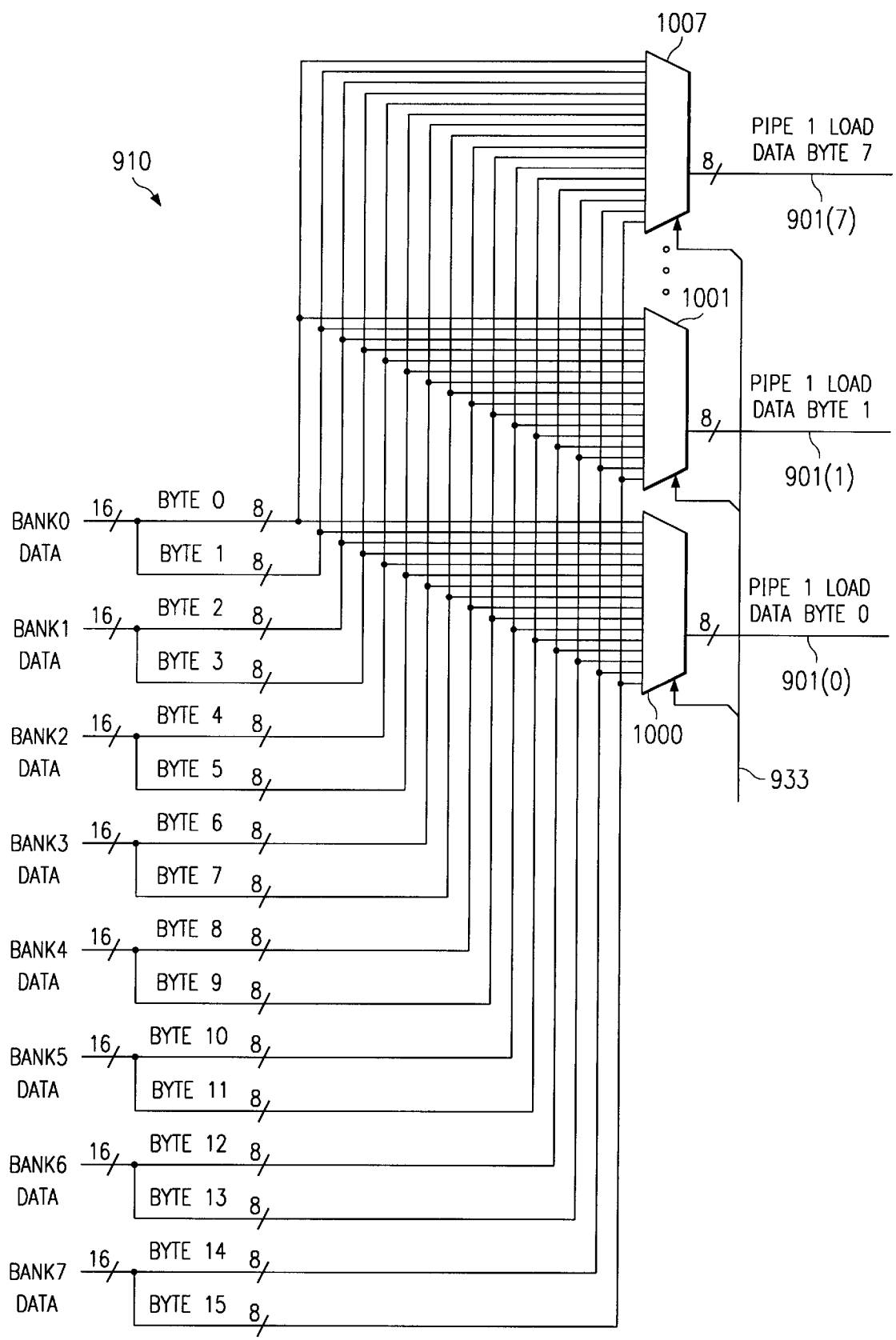
FIG. 10 is a block diagram illustrating the load byte selection circuitry of FIG. 9 in more detail.

FIG. 10 is a block diagram illustrating load byte selection circuitry 910 of FIG. 9 in more detail. For simplicity, only byte select multiplexors 1000–1007 connected to load data byte lanes 901(0)–901(7) are shown for simplicity. Another similar set of multiplexors is connected to load data signals 902. Selected ones of byte selection signals 933 are connected to each multiplexor to select the appropriate one of sixteen bytes provided by the memory bank array.

Figure 11:
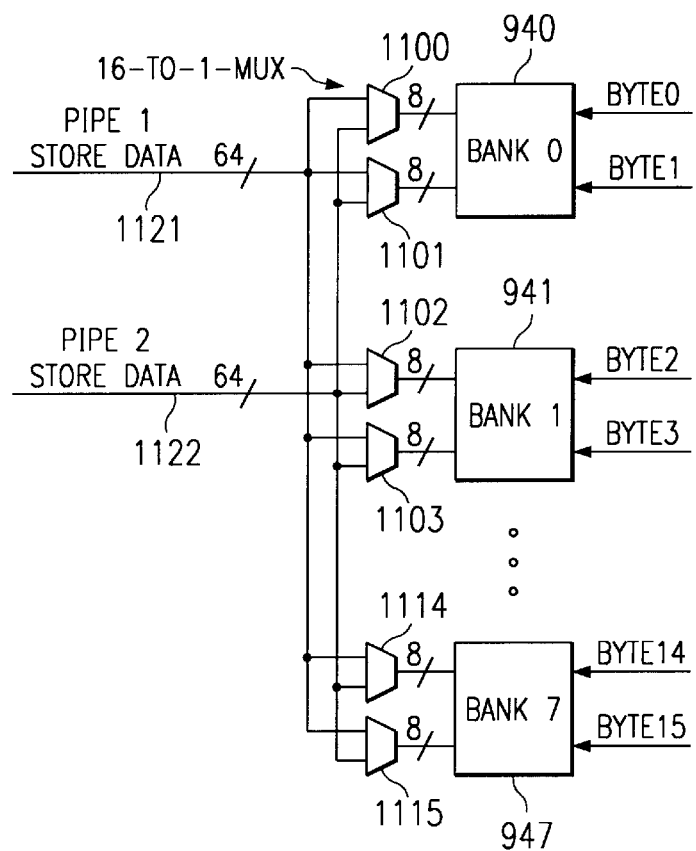
FIG. 11 is a block diagram illustrating the store byte selection circuitry of the memory system FIG. 8 in more detail.

FIG. 11 is a block diagram illustrating the store byte selection circuitry of the memory system FIG. 8 in more detail. Pipe 1 store data signals 1121 provide store data from store data buses ST1*a,b* to byte selection multiplexors 1100–1115. Likewise, Pipe 2 store data signals 1122 provide store data from store data buses ST2*a,b* to byte selection multiplexors 1100–1115. Control signals (not shown) provided to each byte multiplexor from decode circuitry 930 selects the appropriate one of sixteen bytes and presents each selected byte to the respective memory bank 940–947. Write signals byte0–byte15 are asserted as appropriate to cause a selected byte to be written into the respective memory bank.

In this embodiment of the present invention, the load byte selection circuitry and the store byte selection circuitry is required to support the various aligned accesses available via each of the target ports T1, T2. Advantageously, a single non-aligned access can be supported with only minor changes to the byte selection circuitry. Advantageously, all of the memory address decoding circuitry and memory banks do not need any modification and execute a non-aligned access simply as two aligned accesses in response to the two addresses provided on address buses DA1 and DA2.

FIG. 12 is a block diagram of a load/store .D unit, which executes the load/store instructions and performs address calculations. The .D unit receives a base address via first source input src1. An offset value can be selected from either a second source input src2 or from a field in the instruction opcode, indicated at 1200. An address is provided on address output 1202 that is in turn connected to at least one of address multiplexors 200*a,b*. Additionally, an augmented address is provided on address output 1204 for non-aligned accesses. The augmented address is incremented by a byte address value of either four or eight as selected by multiplexer 1210 in response to the line size of the instruction being executed: four is selected for a word instruction and eight is selected for a double word instruction. Adder 1212 increments an address on signal lines 1213 by the amount selected by multiplexer 1210 to form the augmented address that is provided on signal lines 1214. This contiguous address is provided on address output 1204 for a non-aligned access and is connected to the other address multiplexor 200*a,b,* as discussed previously. A calculated address value is also provided to the output dst to update a selected base address register value in the register file when an increment or decrement address mode is selected. The address on signal lines 1213 and the augmented address on signal lines 1214 are passed through circular buffer circuitry 1230 prior to being output on 1202, 1204 so that they can be bounded to remain within a circular buffer region.

In this embodiment, Load and Store instructions operate on data sizes from 8 bits to 64 bits. Addressing modes supported by the .D unit are basic addressing, offset addressing, scaled addressing, auto-increment/auto-decrement, long-immediate addressing, and circular addressing, as defined by mode field 500. In basic addressing mode, the content of a selected base register is used as a memory address. In offset addressing mode, the memory address is determined by two values, a base value and an offset that is either added or subtracted from the base. Referring again to FIGS. 4 and 5, the base value always comes from a base register specified by a field 514 "base R" that is any of the registers in the associated register file 20*a* or 20*b,* whereas the offset value may come from either a register specified by an "offset R" field 516 or a 5-bit unsigned constant UCST5 contained in field 515 of the instruction via signals 1200. Certain load/store instructions have a long immediate address mode that uses a 15-bit unsigned constant contained in the instruction (not shown in FIG. 5). A selected offset is provided on signal lines 1218 to shifter 1220. Scaled addressing mode functions the same as offset addressing mode, except that the offset is interpreted as an index into a table of bytes, half-words, words or double-words, as indicated by the data size of the load or store operation, and the offset is shifted accordingly by shifter 1220 in response to control signals 1226 which are derived by decoding opcode field 510, 512 of the LD/ST instructions.

In this embodiment of the present invention, an SC bit 520 in load/store non-aligned double word (LDNDW/STNDW) instruction controls shifter 1220 so that an offset can be used directly, referred to as unscaled, or shifted by an amount corresponding to the type of instruction, referred to as scaled. Scaled/unscaled control signal 1224 is derived by decoding the SC field 520 of LDNDW/STNDW instructions. If SC field 520 is a logical 0, then the offset is not scaled and signal 1224 is deasserted. If SC field 520 is a logical 1, then the offset is scaled and signal 1224 is asserted. In this embodiment, for instructions other than LDNDW/STNDW, signal 1224 is asserted so that scaling will be performed according to data size control signals 1226.

In auto-increment/decrement addressing mode, the base register is incremented/ decremented after the execution of the load/store instruction by inc/dec unit 1222. There are two sub-modes, pre-increment/decrement, where the new value in the base register is used as the load/store address, and post-increment/decrement where the original value in the register is used as the load/store address. In long-immediate addressing mode, a 15-bit unsigned constant is added to a base register to determine the memory address. In circular addressing mode, the base register along with a block size define a region in memory. To access a memory location in that region, a new index value is generated from the original index modulo the block size in circular addressing unit 1230.

In this embodiment of the invention, a Boolean unit 1240 is provided and can be used for execution of logical instructions when the .D unit is not being used to generate an address.

Figure 13:
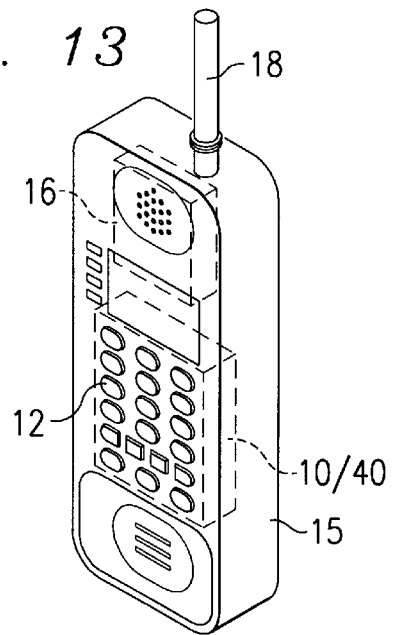
FIG. 13 illustrates an exemplary implementation of a digital system that includes an embodiment of the present invention in a mobile telecommunications device.

FIG. 13 illustrates an exemplary implementation of an example of an integrated circuit 40 that includes digital system 10 in a mobile telecommunications device, such as a wireless telephone with integrated keyboard 12 and display 14. As shown in FIG. 13 digital system 10 is connected to the keyboard 12, where appropriate via a keyboard adapter (not shown), to the display 14, where appropriate via a display adapter (not shown) and to radio frequency (RF) circuitry 16. The RF circuitry 16 is connected to an aerial 18. Advantageously, by allowing selectable scaling of offset values, complex signal processing algorithms can be written in a more efficient manner to satisfy the demand for enhanced wireless telephony functionality.

Fabrication of digital system 1 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

Thus, a digital system is provided with a processor having an improved instruction set architecture. The .D units can also access words and double words on any byte boundary by using non-aligned load and store instructions, and maintain the same instruction execution timing for aligned and non-aligned memory accesses. Advantageously, scaling of an offset value can be selectively performed in response to a scaling field in the LD/ST double non-aligned instruction.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. For example, more than two target memory ports may be provided. Different data widths may be provided, such as 128-bit data items, for example. As long as the size of a non-aligned data item is less than or equal to the size of each aligned access port, then two access ports can be shared to provide a single non-aligned access without adding significant additional resources. Scaling/non-scaling can be selectively included in instructions for data sizes other than double words.

It is therefore contemplated that the appended claims will cover any such modifications of the embodiments as fall within the true scope and spirit of the invention;

What is claimed is:

1. A digital system, comprising;
  a central processing unit (CPU) having an instruction execution pipeline operable to fetch, decode, and execute a sequence of instructions, the CPU comprising:
  decode circuitry for determining an instruction type of certain ones of the sequence of instructions based on an opcode field of the each of the certain instructions;
  an address port for providing addresses for accessing data; and
  address generation circuitry connected to the address port, the address generation circuitry operable to form an address in response to certain instructions from the sequence of instructions, wherein the address generation circuitry is operable to form an address by combining a base address value and an offset value such that the offset value is selectively scaled according to the instruction type or not scaled.

2. The digital system of claim 1, wherein the address circuitry is responsive to a first field in the certain instructions, such that when the field has a first value the offset is scaled, and when the field has a second value the offset is not scaled.

3. The digital system of claim 2, wherein the CPU further comprises a plurality of address generation circuits connected to the address port, wherein each address generation circuit is operable to form an address by combining a base value and an offset value such that the offset value is selectively scaled or not scaled.

4. The digital system of claim 1, further comprising a memory circuit connected to the address port.

5. The digital system of claim 4, further comprising an instruction memory connected to an instruction port of the CPU.

6. A method of operating a microprocessor, comprising the steps of:
fetching an instruction for execution;
decoding the instruction to form a plurality of fields, such that an instruction type is determined based on an opcode field; and
forming an address for accessing a data item for the instruction by combining a base address value and an offset value, such that the offset value is selectively scaled according to the instruction type or not scaled.

7. The method of claim 6, wherein the step of forming an address comprises the step of scaling the offset value associated with the instruction only if a first field of the instruction has a first value, such that the offset value is not scaled if the first field has a second value.

8. The method of claim 6, wherein the step of forming an address scales the offset value of a certain type of instruction only if a first field of the certain type of instruction has a first value, such that the offset value is not scaled if the first field has a second value.

9. The method of claim 6, further comprising the step of accessing the data item; wherein the offset value is an increment value or a decrement value and wherein he step of forming an address is performed prior to the step of accessing the data item.

10. The method of claim 6, further comprising the step of accessing the data item; wherein the offset value is an increment value or a decrement value and wherein he step of forming an address is performed after the step of accessing the data item.

11. The method of claim 6, wherein the step of forming an address combines the base address value, an offset value and an increment value, such that both the offset value and the increment value are selectively scaled according to the instruction type.

12. The method of claim 6, further comprising the steps of:
accessing the data item using the combined address; and
post incrementing the combined address with an increment value, such that the increment value is selectively scaled according to the instruction type.

* * * * *